United States Patent
Thackeray et al.

(10) Patent No.: US 7,435,509 B2
(45) Date of Patent: Oct. 14, 2008

(54) ELECTRODE FOR A LITHIUM CELL

(75) Inventors: Michael M. Thackeray, Naperville, IL (US); John T. Vaughey, Elmhurst, IL (US); Dennis W. Dees, Downers Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 321 days.

(21) Appl. No.: 10/338,507

(22) Filed: Jan. 7, 2003

(65) Prior Publication Data

US 2004/0048156 A1 Mar. 11, 2004

Related U.S. Application Data

(60) Provisional application No. 60/409,440, filed on Sep. 10, 2002.

(51) Int. Cl.
H01M 4/34 (2006.01)
H01M 4/54 (2006.01)
H01M 10/32 (2006.01)
H01M 4/58 (2006.01)

(52) U.S. Cl. ............... 429/219; 429/231.5; 429/231.6; 429/231.8

(58) Field of Classification Search ............ 429/209, 429/219, 231.95
See application file for complete search history.

(56) References Cited

U.S. PATENT DOCUMENTS

| | | | |
|---|---|---|---|
| 4,310,609 A | 1/1982 | Liang et al. | |
| 4,391,729 A | 7/1983 | Liang et al. | |
| 5,039,582 A | 8/1991 | Pistoia | |
| 5,336,572 A * | 8/1994 | Koksbang | 429/219 |
| 5,340,368 A * | 8/1994 | Koksbang et al. | 29/623.5 |
| 5,545,497 A * | 8/1996 | Takeuchi et al. | 429/219 |
| 5,955,218 A * | 9/1999 | Crespi et al. | 429/219 |
| 5,993,999 A * | 11/1999 | Rivers et al. | 429/244 |
| 6,391,494 B2 * | 5/2002 | Reitz et al. | 429/219 |
| 2002/0081493 A1 * | 6/2002 | Leising et al. | 429/219 |
| 2003/0082449 A1 * | 5/2003 | Gan et al. | 429/219 |

OTHER PUBLICATIONS

Takeuchi et al., Lithium/Silver Vanadium Oxide Batteries With Various Silver to Vanadiaum Ratios, Journal of Power Sources, vol. 21, p. 133 (1987).

Leising et al., Solid-State Materials for Lithium Batteries: Effect of Synthesis Temperature on the Physical and Electrochemical Properties of Silver Vanadium Oxide, Chemistry of Materials, vol. 5, p. 738 (1987).

(Continued)

Primary Examiner—Patrick Ryan
Assistant Examiner—Julian Mercado
(74) Attorney, Agent, or Firm—Olson & Cepuritis, Ltd.

(57) ABSTRACT

This invention relates to a positive electrode for an electrochemical cell or battery, and to an electrochemical cell or battery; the invention relates more specifically to a positive electrode for a non-aqueous lithium cell or battery when the electrode is used therein. The positive electrode includes a composite metal oxide containing $AgV_3O_8$ as one component and one or more other components consisting of $LiV_3O_8$, $Ag_2V_4O_{11}$, $MnO_2$, $CF_x$, $AgF$ or $Ag_2O$ to increase the energy density of the cell, optionally in the presence of silver powder and/or silver foil to assist in current collection at the electrode and to improve the power capability of the cell or battery.

30 Claims, 14 Drawing Sheets

OTHER PUBLICATIONS

Leising et al., Solid-State Synthesis and Characterization of Silver Vanadium Oxide For Use As a Cathode Material for Lithium Batteries; Chemistry of Material, vol. 6, p. 489 (1994).

Garcia-Alvarado et al., Lithium Intercalation in Ag2V4O11, Solid State Ionics, vol. 6, p. 489 (1994).

Kawakita et la., Lithium Insertion Behavior of Sliver Vanadium Bronze;Solid State Ionics, vol. 99, p. 71, (1997).

Rozier et al., Ag . . . Crystal Structure: Relationship with Ag . . . and Interpretation of Physical Properties; Journal of Solid State Chemistry, vol. 134, p. 294 (1977).

Wadsley et al., Crystal Chemistry of Non-stoichiometric pentavalent Vanadium Oxides: . . . Acta Crystallographica, vol. 10, p. 261 (1957).

dePicciotto et al., Structural characterization of Li . . . Single Crystal X-ray Diffraction; Solid State Ionics, vol. 62, p. 297 (1993).

Panera et al., Rechargeable Lithium . . . Cells; Journal of the Electrochemical Society, vol. 130, p. 1225 (1983).

West et al., Comparison of LiV . . . Prepared by Different Methods; Journal of the Electrochemical Society, vol. 143, p. 820, (1996).

Spahr et al., Electrochemistry of Chemically Lithiated . . . : Material for Use in Rechargeable Lithium-Ion Batteries; Journal of the Electrochemical Society, vol. 145, p. 421, 1998).

* cited by examiner

US 7,435,509 B2

ELECTRODE FOR A LITHIUM CELL

RELATED APPLICATIONS

This application, pursuant to 37 C.F.R. 1.78(c), claims priority based on provisional application Ser. No. 60/409,440 filed on Sep. 10, 2002.

The United States Government has rights in this invention pursuant to Contract No. W-31-109-ENG-38 between the U.S. Department of Energy (DOE) and The University of Chicago representing Argonne National Laboratory.

FIELD OF INVENTION

This invention relates to electrochemical cells and batteries and more particularly to improved positive electrode materials for non-aqueous lithium cells. The electrodes consist of a composite system having as one component a silver-vanadium-oxide of nominal composition $AgV_3O_8$. The predominant, but not exclusive, field of use is for primary (non-rechargeable) lithium batteries with particular emphasis on powering medical devices such as cardiac pacemakers, defibrillators and medical pumps.

BACKGROUND OF THE INVENTION

Lithium electrochemical cells and batteries are being widely exploited as power sources for numerous applications because of their high energy and power density, for example, in consumer electronics such as laptop computers and cellular phones, in medical devices such as cardiac pacemakers and defibrillators and in electric and hybrid electric vehicles.

Silver vanadium oxides, particularly $Ag_2V_4O_{11}$, are well known as positive electrode materials for primary lithium cells for powering cardiac defibrillators in the medical industry. For example, U.S. Pat. Nos. 4,310,609 and 4,391,729 discloses the use of an electrochemical cell having as its positive electrode a composite oxide matrix consisting of a vanadium oxide chemically reacted with a group IB, IIB, IIIB, IVB, VB, VIB, VIIB and VIII metal, and most specifically with a silver containing compound. U.S. Pat. No. 4,391,729 also discloses a method of making such a cathode. In addition, several scientific papers describing the structural and electrochemical properties of $Ag_2V_4O_{11}$ and $Ag_2V_4O_{11-x}$ and $AgV_3O_8$ have appeared in the literature, such as that of Takeuchi et al (Journal of Power Sources, Volume 21, page 133 (1987); Leising et al (Chemistry of Materials, Volume 5, page 738 (1993)); Leising et al (Chemistry of Materials, Volume 6, page 489 (1994)); Garcia-Alvarado et al (Solid State Ionics, Volume 73, page 247 (1994)); Kawakita et al (Solid State Ionics, Volume 99, page 71 (1997)); Rozier et al, (Journal of Solid State Chemistry, Volume 134, page 294 (1997)). Moreover, lithium vanadium oxide electrodes, such as $Li_{1.2}V_3O_8$, are also well known for their good electrochemical properties in rechargeable or secondary lithium cells. For example, U.S. Pat. No. 5,039,582 discloses the use of an amorphous form of $LiV_3O_8$ as a positive electrode in a lithium cell, and U.S. Pat. No. 5,336,572 discloses the use of $M_xV_3O_8$ positive electrodes for lithium cells, where M is a monovalent or multivalent metal cation. In addition, numerous research papers on the structural and electrochemical properties of $Li_xV_3O_8$ materials have been written, such as that of Wadsley et al (Acta Crystallographica, Volume 10, page 261 (1957)); de Picciotto et al (Solid State Ionics, Volume 62, page 297 (1993); Panera et al (Journal of the Electrochemical Society, Volume 130, page 1225 (1983)); West et al (Journal of the Electrochemical Society, Volume 143, page 820 (1996)). Spahr et al has disclosed the use of $NaV_3O_8$ as a cathode in a lithium cell (Journal of the Electrochemical Society, Volume 145, page 421 (1998)).

A problem that is encountered with state-of-the-art $Ag_2V_4O_{11}$ cathodes in lithium cells is the deterioration of electrochemical performance, particularly the ability of the cells to deliver acceptable pulse power before the cell has reached the end of its expected calendar and operating life. It can therefore be readily understood that such limitations of $Li/Ag_2V_4O_{11}$ cells are of great concern when used to power cardiac defibrillators in the human body. Such limitations negatively affect product reliability and necessitate a continual monitoring of the cells while implanted in patients to ensure a timely replacement of the cells before they prematurely reach the end of discharge. There is therefore a great need to improve the electrochemical properties and operating life of silver-vanadium-oxide electrodes for lithium cells and batteries, particularly for use in life-supporting medical devices, such as cardiac defibrillators.

SUMMARY OF THE INVENTION

This invention relates to a positive electrode for an electrochemical cell or battery, and to an electrochemical cell or battery; the invention relates more specifically to an improved positive electrode for a non-aqueous lithium cell or battery when the electrode is used therein, the positive electrode comprising a composite metal oxide containing $AgV_3O_8$ as one component and one or more components selected from $LiV_3O_8$, $Ag_2V_4O_{11}$, $MnO_2$, $CF_x$, $AgF$ or $Ag_2O$ to increase the energy density of the cell optionally in the presence of silver powder and/or silver foil to assist in current collection at the electrode and to improve the power capability of the cell or battery. When the composite electrode consists of $AgV_3O_8$ and $LiV_3O_8$ components, the electrode has the general formula $xAgV_3O_8 \cdot (1-x)LiV_3O_8$ (or alternatively $Ag_xLi_{1-x}V_3O_8$). The invention extends to include substituted $Ag_xLi_{1-x}V_{3-y}M_yO_8$ electrode compounds in which the limits of x and y are $0<x<1$, $0<y<1.5$, respectively, and where M is a monovalent or multivalent ion of one or more transition metals and most preferably one or more of Ti, Y, Zr, Nb and Mo ions.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENTS

Figure 1:
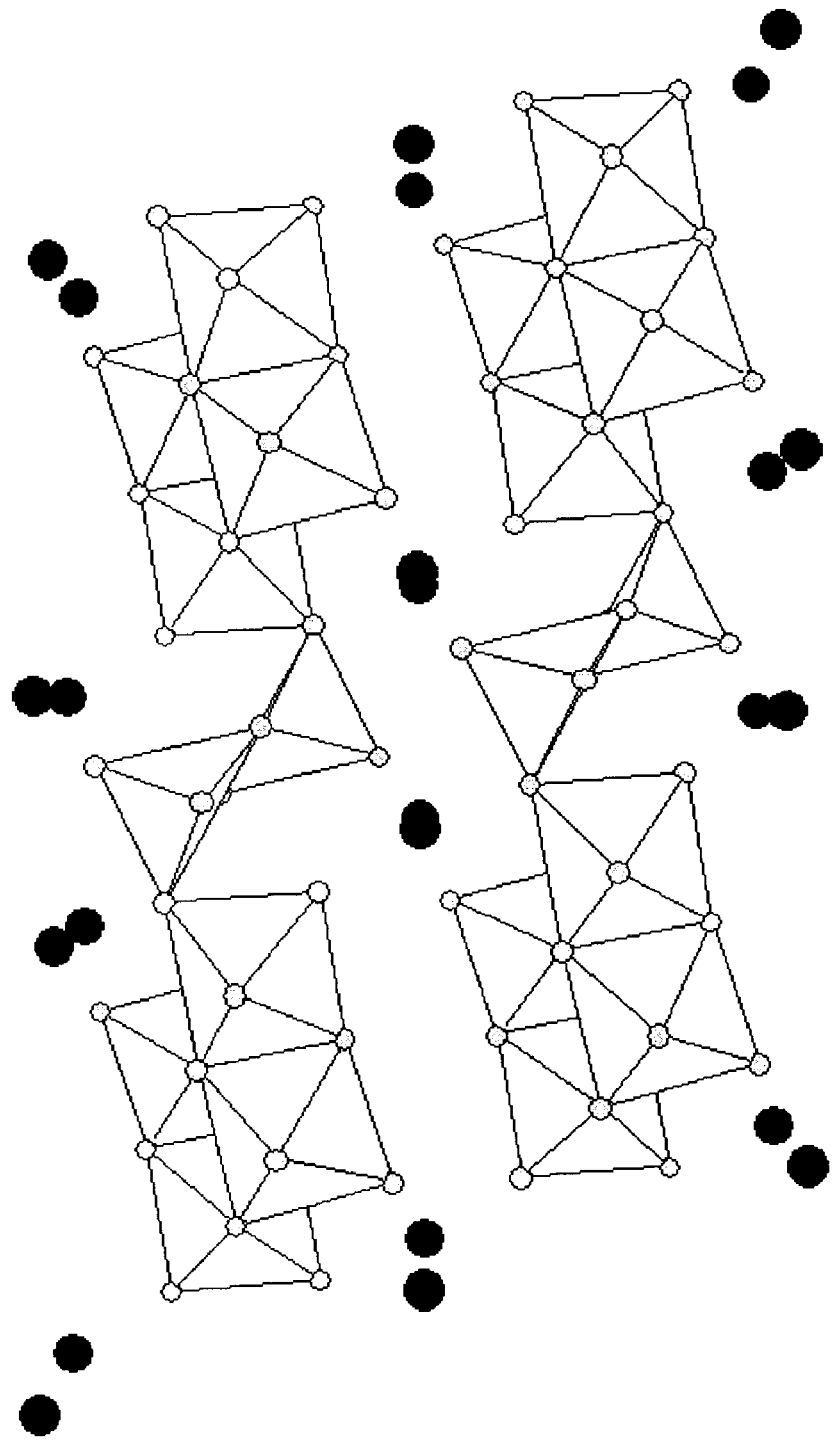
FIG. 1 depicts a schematic illustration of a $LiV_3O_8$ or $AgV_3O_8$ structure.

State-of-the-art cardiac defibrillators are powered by lithium batteries in conjunction with electrolytic capacitors. The batteries contain a metallic lithium negative electrode, a silver-vanadium oxide positive electrode of composition Ag$_2$V$_4$O$_{11}$, and a non-aqueous liquid electrolyte consisting of a lithium salt such as LiAsF$_6$ dissolved in an organic solvent, such as a 50:50 mixture of propylene carbonate and dimethoxyethane. Li/Ag$_2$V$_4$O$_{11}$ cells discharge by an electrochemical process that involves lithium insertion into the crystal lattice of Ag$_2$V$_4$O$_{11}$ with a simultaneous reduction of the silver ions and their concomitant extrusion from the crystal lattice. Thereafter, lithium insertion is accompanied by the reduction of the vanadium ions within the structure, ideally from V$^{5+}$ to V$^{4+}$. Thus, the reaction can be broadly defined in the ideal case as taking place in two main steps:

Li+Ag$_2$V$_4$O$_{11}$→Li$_2$V$_4$O$_{11}$+2Ag  (Step 1: Silver displacement)

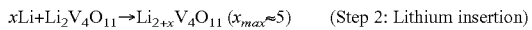

xLi+Li$_2$V$_4$O$_{11}$→Li$_{2+x}$V$_4$O$_{11}$ (x$_{max}$≈5)  (Step 2: Lithium insertion)

One of the major limitations of Li/Ag$_2$V$_4$O$_{11}$ cells is that they lose their capability of providing the necessary power particularly after the reaction described in Step 1 has occurred, and when cells are allowed to stand for prolonged periods of time. It is believed that this loss in power may be attributed, at least in part, to the Ag$_2$V$_4$O$_{11}$ positive electrode, and in particular, that it may be attributed to the fact that at the end of Step 1, a metastable phase of composition Li$_2$V$_4$O$_{11}$ is formed. This metastability is reflected by the fact that it has not been possible to synthesize a Li$_2$V$_4$O$_{11}$ phase that is isostructural with Ag$_2$V$_4$O$_{11}$ by independent chemical methods in the laboratory. Attempts to synthesize a Li$_2$V$_4$O$_{11}$ phase in the laboratory, for example, by reacting Ag$_2$V$_4$O$_{11}$ with n-butyllithium, have failed; these attempts have always yielded other stable lithium-vanadium-oxide phases such as LiVO$_3$ and LiV$_3$O$_8$. This finding indicates that the power fade may at least be partly attributed to a decay of the "Li$_2$V$_4$O$_{11}$" phase that is generated electrochemically during Step 1 into other more stable lithium-vanadium-oxide compounds.

This invention addresses this problem and advocates the use of alternative electrode materials for Ag$_2$V$_4$O$_{11}$ electrodes, and particularly composite electrodes in which AgV$_3$O$_8$ is one component of the electrode. In one embodiment of the invention, the electrode is a composite electrode of AgV$_3$O$_8$ and LiV$_3$O$_8$ having the general formula xAgV$_3$O$_8$·(1−x)LiV$_3$O$_8$ (or alternatively, Ag$_x$Li$_{1−x}$V$_3$O$_8$) for 0<x<1. Because the of AgV$_3$O$_8$ and LiV$_3$O$_8$ are similar, it is envisaged that a solid solution or mixture of phases may exist between AgV$_3$O$_8$ and LiV$_3$O$_8$, the latter phase being known to be an extremely stable material and easy to synthesize by chemical methods in the laboratory, unlike hypothetical "Li$_2$V$_4$O$_{11}$". The advantage of such a system is that after displacement or extrusion of the Ag from the Ag$_x$Li$_{1−x}$V$_3$O$_8$ structure or composite structure (analogous to Step 1 given for Ag$_2$V$_4$O$_{11}$ above) the compound, LiV$_3$O$_8$, is generated that is stable in the cell environment; furthermore, it is known that the LiV$_3$O$_8$ thus formed, can accommodate additional lithium without disruption of the V$_3$O$_8$ framework to a composition Li$_{1+y}$V$_3$O$_8$, where y$_{max}$=4. Thus for an undoped electrode, the two main discharge reactions for an Ag$_x$Li$_{1−x}$V$_3$O$_8$ electrode would ideally be (by analogy to Steps 1 and 2 above):

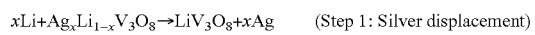

xLi+Ag$_x$Li$_{1−x}$V$_3$O$_8$→LiV$_3$O$_8$+xAg  (Step 1: Silver displacement)

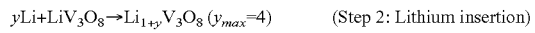

yLi+LiV$_3$O$_8$→Li$_{1+y}$V$_3$O$_8$ (y$_{max}$=4)  (Step 2: Lithium insertion)

It will be appreciated by those skilled in the art, that in practice when AgV$_3$O$_8$ and LiV$_3$O$_8$ compounds are synthesized, their stoichiometries may vary slightly from their numerically ideal formulae. For example, it has been well established that the thermodynamically stable stoichiometry of the lithium-vanadium-oxide compound when synthesized at approximately 600° C. is Li$_{1.2}$V$_3$O$_8$. The 3 vanadium ions of the formula unit reside in either octahedral or square-pyramidal sites (shown as connected polyhedra in FIG. 1). Of the 1.2 lithium ions, 1.0 Li ions occupy octahedral sites (shown as black dots in FIG. 1) and the remaining 0.2 Li ions partially occupy tetrahedral sites (not shown in FIG. 1). It is therefore possible that small deviations in stoichiometry may also occur for AgV$_3$O$_8$. This invention therefore allows for such deviations in stoichiometry and the simplified formula xAgV$_3$O$_8$·(1−x)LiV$_3$O$_8$, alternatively Ag$_x$Li$_{1−x}$V$_3$O$_8$, is merely used for convenience.

In a second embodiment, this invention includes substituted Ag$_x$Li$_{1−x}$V$_{3−y}$M$_y$O$_8$ electrode compounds in which the limits of x and y are 0<x<1, 0<y<1.5, respectively, and where M is a monovalent or multivalent ion of one or more transition metals. Such metal substitutions in LiV$_{3−y}$M$_y$O$_8$ compounds, in which M can, for example, be selected typically from one or more of Ti, Y, Zr, Nb and Mo as already disclosed in U.S. Pat. No. 6,322,928, can be used to impart greater stability to the LiV$_3$O$_8$ electrode structure. It is believed that such substitutions could also be used to stabilize the V$_3$O$_8$ framework of the Ag$_x$Li$_{1−x}$V$_{3−y}$M$_y$O$_8$ electrodes of this invention.

A significant advantage of using xAgV$_3$O$_8$·(1−x)LiV$_3$O$_8$ or Ag$_x$Li$_{1−x}$V$_{3−y}$M$_y$O$_8$ electrode is that it is possible to vary the Ag:Li ratio in the initial electrode, thus providing the opportunity to tailor and optimize the gravimetric and volumetric capacities of the electrode and hence the gravimetric and volumetric energy densities of the lithium cell. For example, the theoretical gravimetric and volumetric capacities for AgV$_3$O$_8$ are 345 mAh/g and 1518 mAh/ml, respectively, whereas for LiV$_3$O$_8$ the theoretical and volumetric capacities are 373 mAh/g and 1350 mAh/ml, respectively (see Table 1). Furthermore, because it is believed that Ag in the crystal structure may hinder Li$^+$-ion transport in the electrode during cell operation, it is further believed that the power capability of the xAgV$_3$O$_8$·(1−x)LiV$_3$O$_8$ or Ag$_x$Li$_{1−x}$V$_{3−y}$M$_y$O$_8$ electrode will be achieved by fine-tuning the Ag:Li ratio in the initial structure.

In a third embodiment, the composite electrode consists of the AgV$_3$O$_8$, xAgV$_3$O$_8$·(1−x)LiV$_3$O$_8$ or Ag$_x$Li$_{1−x}$V$_{3−y}$M$_y$O$_8$ component with one or more components selected from Ag$_2$V$_4$O$_{11}$, MnO$_2$, CF$_x$, AgF and/or Ag$_2$O to improve the energy density of the lithium cell. In this respect, blended (composite) electrodes comprised of Ag$_2$V$_4$O$_{11}$ and CF$_x$ are known in the art. Improvements in the electrochemical properties of the electrodes and cells of the present invention can be obtained by optionally blending the electrodes with $Ag_2V_4O_{11}$, $MnO_2$, $CF_x$, AgF and/or $Ag_2O$.

Table 1 demonstrates from theoretical values how, in principle, the addition of one (or more) components to a $AgV_3O_8$ electrode can increase the energy density of the cell either in terms of specific energy density (Wh/kg) and/or volumetric energy density (Wh/l). The voltage of each lithium cell provided in Table 1 reflects the average open circuit voltage (OCV) of the cell during discharge, as determined from the OCV values that were recorded after each pulse, to an end voltage of 1.7 V.

TABLE 1

Electrochemical and physical properties of various electrode components

| Electrode Material | Li uptake (max) | Th. Cap. (mAh/g) | ρ (g/ml) | Th. Cap. (mAh/ml) | Voltage (OCV) | Th. Energy Dens. Wh/kg | Wh/l |
|---|---|---|---|---|---|---|---|
| Primary Component | | | | | | | |
| $AgV_3O_8$ | 5 | 345 | 4.40 | 1518 | 2.65 | 914 | 4022 |
| Secondary Components | | | | | | | |
| $LiV_3O_8$ | 4 | 373 | 3.62 | 1350 | 2.70 | 1007 | 3645 |
| $MnO_2$ | 1 | 308 | 4.83 | 1487 | 2.85 | 878 | 4241 |
| $Ag_2V_4O_{11}$ | 7 | 315 | 4.94 | 1556 | 2.64 | 832 | 4110 |
| $CF_x$ | 0.6 | 687 | 2.60 | 1786 | ~3.0 | 2061 | 5359 |
| AgF | 1 | 211 | 5.85 | 1234 | ~3.3 | 696 | 4071 |
| $Ag_2O$ | 2 | 231 | 7.29 | 1683 | ~3.0 | 693 | 5052 |

In a fourth embodiment, the electrodes of this invention are mixed with Ag powder which serves as an additional current collector to the carbon powder (typically acetylene black) which is conventionally present with metal oxide electrodes in lithium cells. Furthermore, it is believed that the Ag powder acts as nucleating sites for the silver metal that is extruded from the $AgV_3O_8$, $Ag_2V_4O_{11}$, AgF and $Ag_2O$ components during discharge, thereby enhancing the current collection at the electrode and the power capability of the cell. Alternatively, when laminated electrodes are used, silver foil is used as the current collector onto which the electrochemically active electrode powder is cast. This invention therefore extends to include silver current collectors for silver vanadium oxide electrodes, in general, for application in lithium electrochemical cells and batteries.

The negative electrodes of the electrochemical cells of the present invention may be selected from any suitable lithium-containing compound known in the art, for example, metallic lithium, lithium alloys, lithium intermetallic compounds and lithiated carbon, such as lithiated graphite $Li_xC_6$ in which x can reach a typical value of 1. Preferably, the negative electrode is metallic lithium.

Likewise the non-aqueous electrolyte may be selected from any suitable electrolyte salts and solvents that are known in the art. Examples of well known salts are $LiClO_4$, $LiAsF_6$, $LiPF_6$, $LiBF_4$ and $LiB(C_2O_4)_2$, and typical electrolyte solvents are propylene carbonate, ethylene carbonate, diethyl carbonate, dimethyl carbonate, diethyl ether, dimethoxyethane and the like.

The principles of this invention are provided in the following examples.

Synthesis and Preparation of Electrode Materials

EXAMPLE 1

Figure 2:
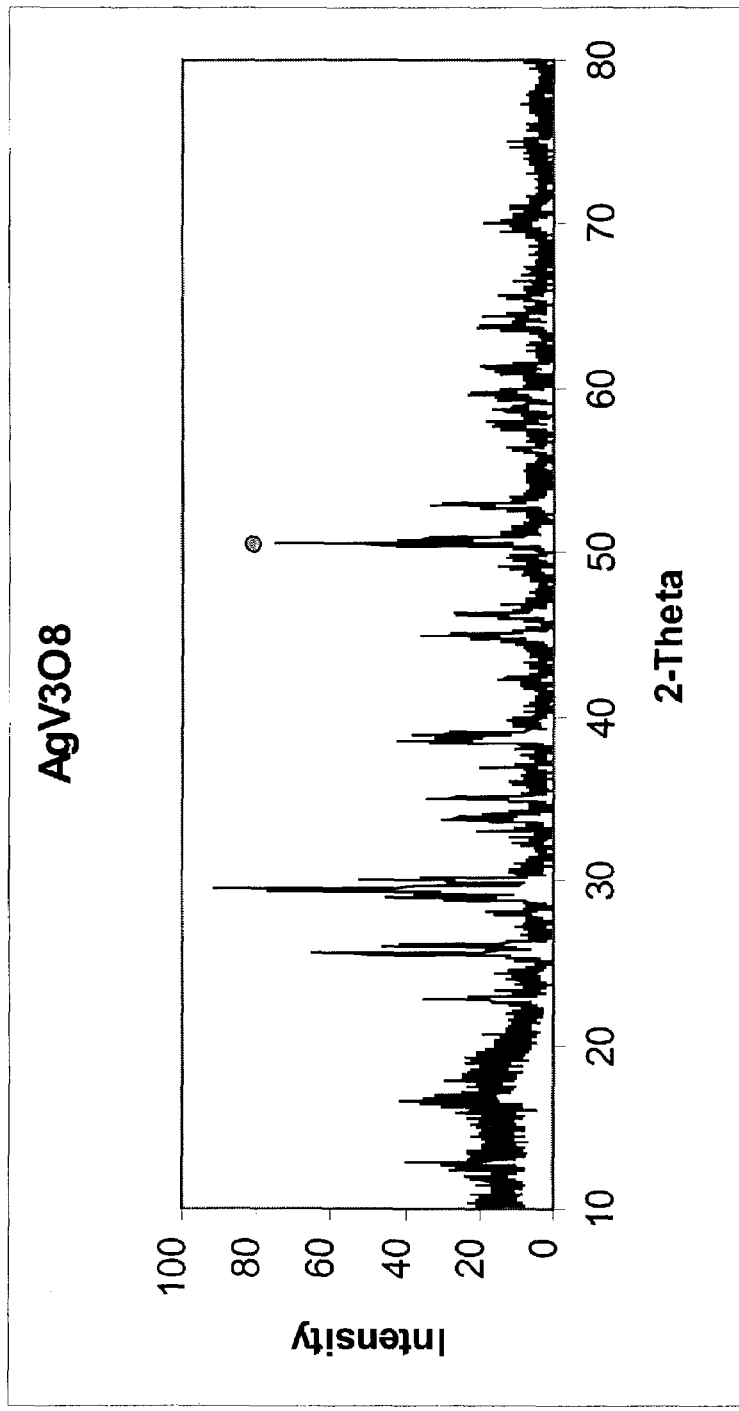
FIG. 2 depicts the powder X-ray diffraction pattern of $AgV_3O_8$.

$AgV_3O_8$ was prepared by direct reaction of stoichiometric amounts of $NH_4VO_3$ and $AgNO_3$ powders under oxygen at 530° C. The powder X-ray diffraction pattern of the resulting product is shown in FIG. 2.

EXAMPLE 2

Figure 3:
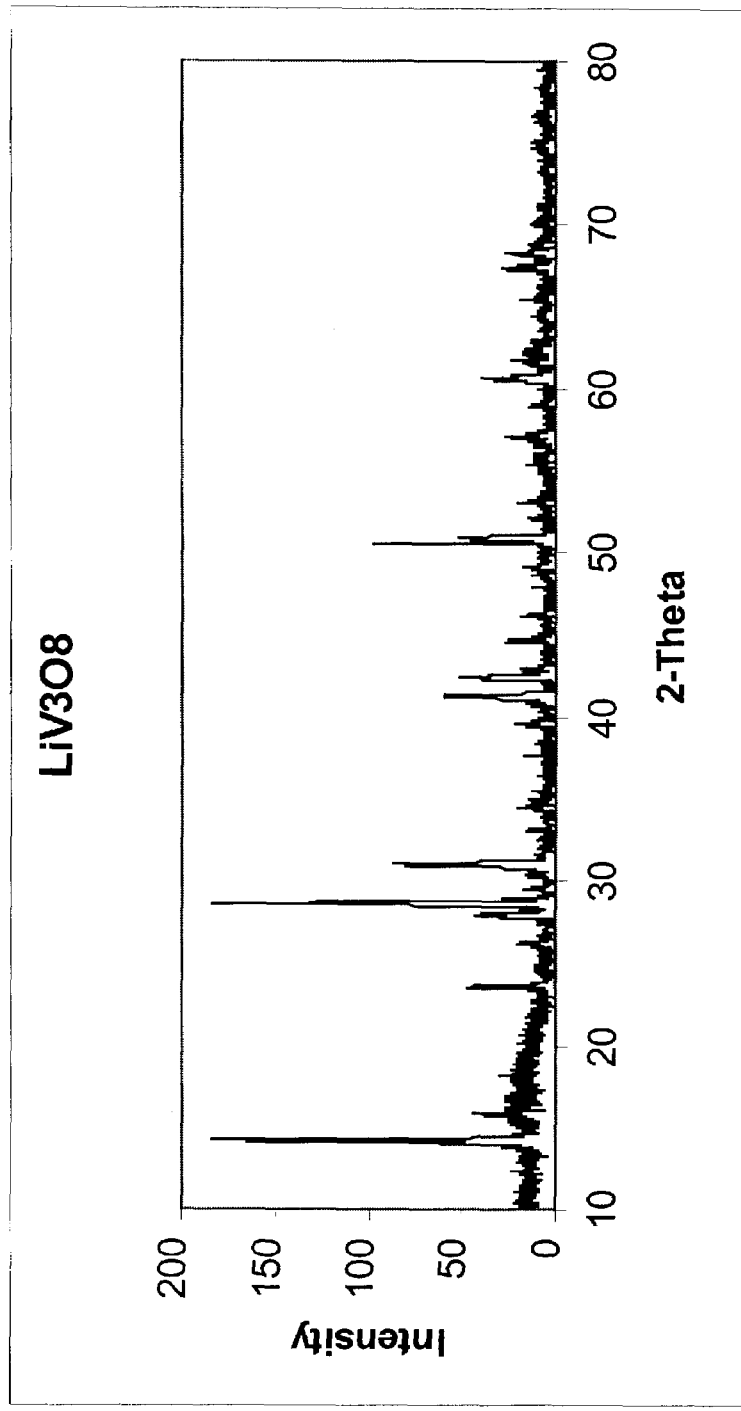
FIG. 3 depicts the powder X-ray diffraction pattern of $LiV_3O_8$.

$LiV_3O_8$ was prepared by direct reaction of stoichiometric amounts of $NH_4VO_3$ and $Li_2CO_3$ powders in air at 550° C. The powder X-ray diffraction pattern of the resulting product is shown in FIG. 3.

EXAMPLE 3

Figure 4:
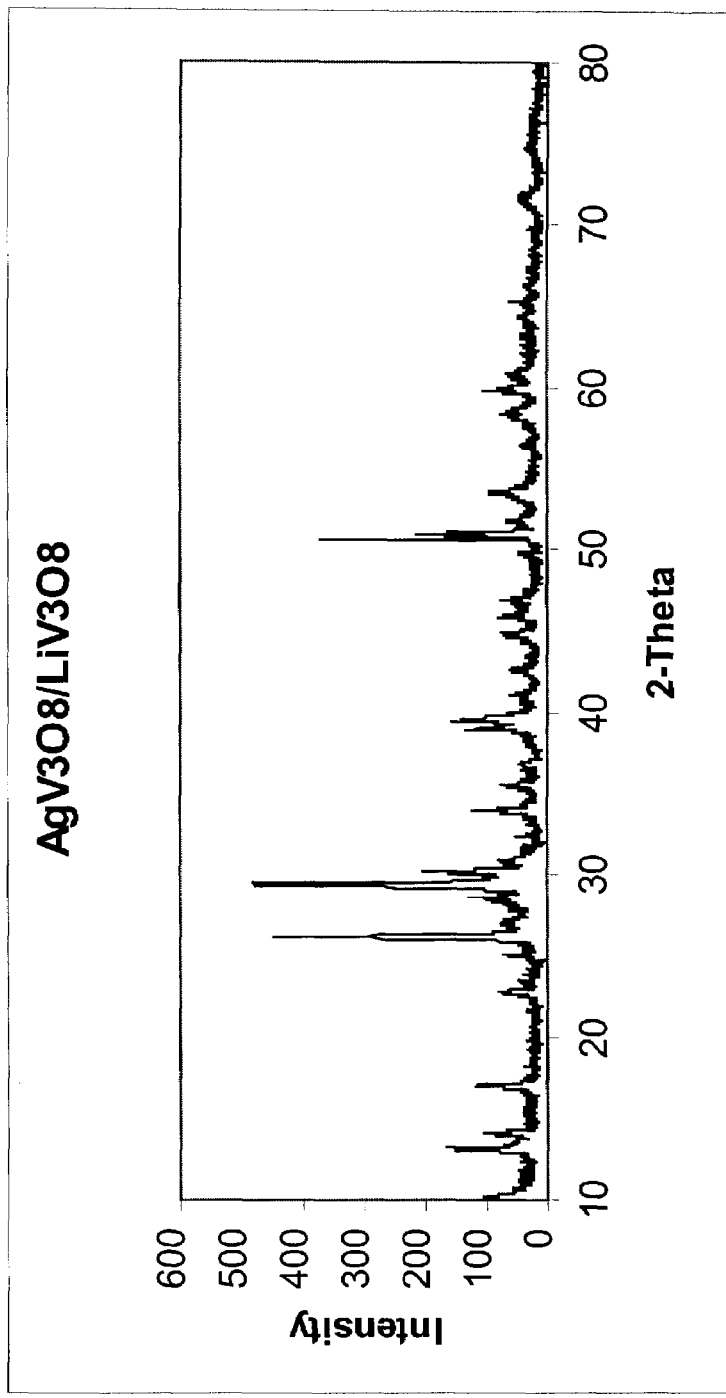
FIG. 4 depicts the powder X-ray diffraction pattern of a $xAgV_3O_8 \cdot (1-x)LiV_3O_8$ composite.

A composite electrode powder $xAgV_3O_8 \cdot (1-x)LiV_3O_8$ in which x=0.5 was prepared by milling the two separate powders of $AgV_3O_8$ and $LiV_3O_8$ under acetone (or methanol) for 3 days, followed by filtering and drying the product under vacuum at room temperature. The powder X-ray diffraction pattern of the resulting product is shown in FIG. 4. Although the two components of this example were mixed in a 50/50 weight ratio, other variations are specifically included in the invention.

EXAMPLE 4

Figure 5:
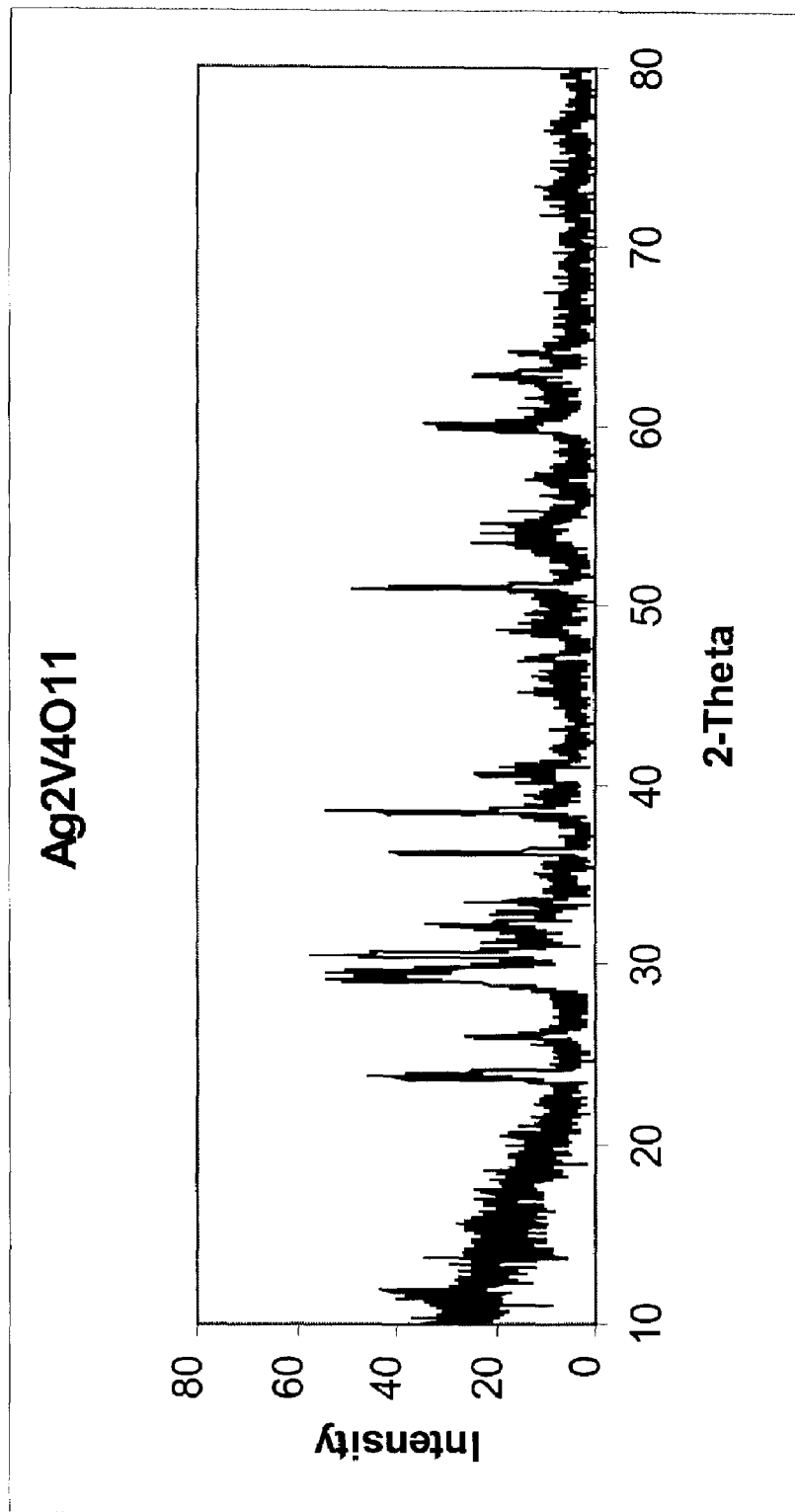
FIG. 5 depicts the powder X-ray diffraction pattern of $Ag_2V_4O_{11}$.
Figure 6:
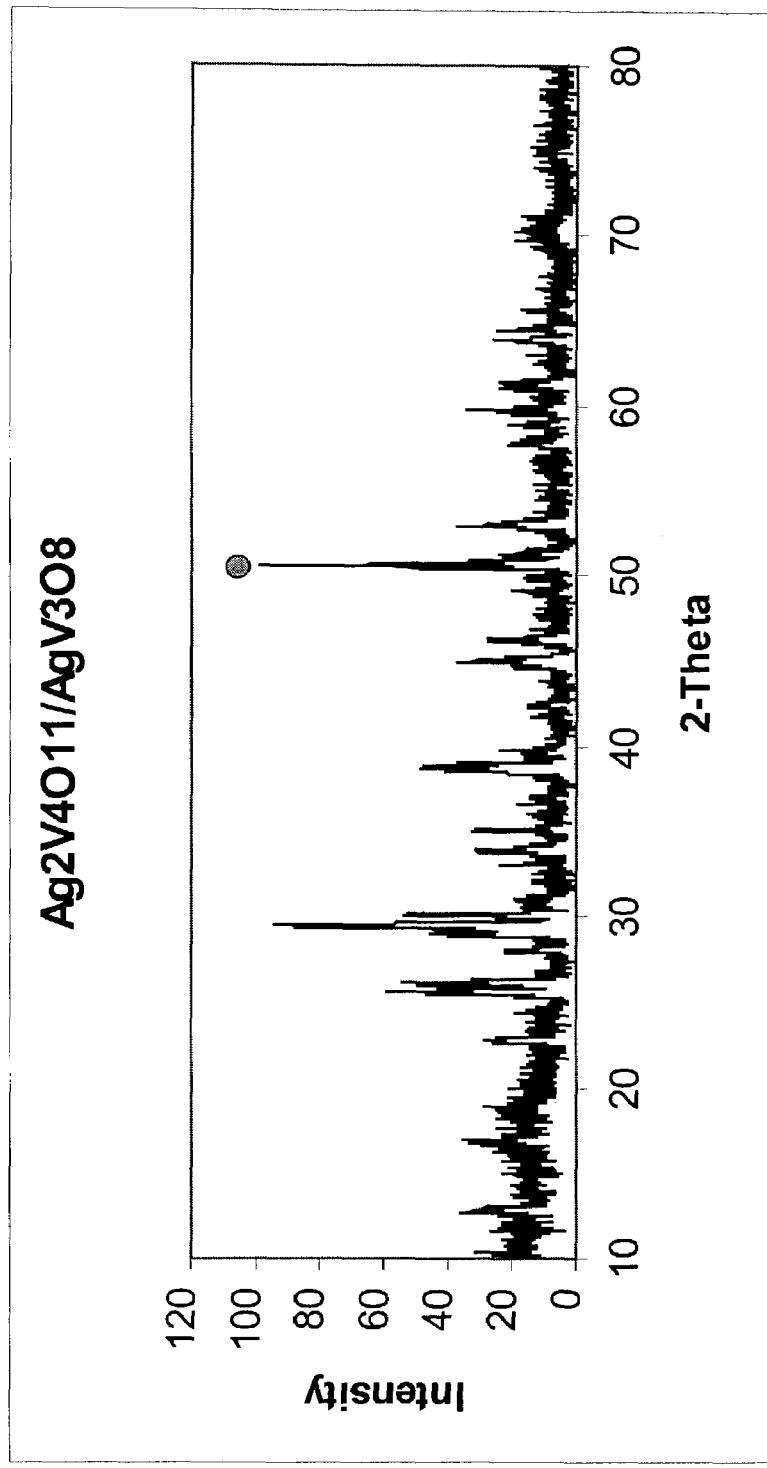
FIG. 6 depicts the powder X-ray diffraction pattern of a $AgV_3O_8/Ag_2V_4O_{11}$ composite

$Ag_2V_4O_{11}$ was prepared by direct reaction of stoichiometric amounts of $NH_4VO_3$ and $AgNO_3$ powders in air at 500° C. The powder X-ray diffraction pattern of the resulting product is shown in FIG. 5.

EXAMPLE 5

Composite electrode powders were prepared by using intimately mixed blends of the following materials:
1. $AgV_3O_8$:$Ag_2V_4O_{11}$ (95:5 ratio by weight);
2. $AgV_3O_8$:$MnO_2$ (50:50 ratio by weight);
3. $AgV_3O_8$/$Ag_2O$ (97:3 ratio by weight);
4. $AgV_3O_8$/Ag (95:5 ratio by weight);

For these composite electrodes, the $AgV_3O_8$ and $Ag_2V_4O_{11}$ powders were prepared as described in Examples 1 and 4, respectively. The $MnO_2$ was obtained as an electrolytic manganese dioxide (EMD) from Chemetals. The $Ag_2O$ and Ag powders were supplied by Aldrich.

Electrochemical Evaluation

In general, the lithium cells were fabricated as follows. Positive electrode laminates were made by the following general procedure. The active electrode powders were sifted to <40 μm, mixed with 8 w/o carbon (acetylene black and SFG6) and 8 w/o polyvinlyidine difluoride (PVDF) binder and cast onto an Al foil with NMP dilutant. The cast laminate was subsequently dried at 70°, and placed into a vacuum oven overnight. Coin cells of size 2032 (2.0 cm diameter, 3.2 mm high) were used for the electrochemical evaluations. The positive electrode consisted of a 1.6 cm diameter disc, punched from the laminate; a corresponding disc of metallic lithium, punched from lithium foil served as the negative electrode. Electrodes were insulated from one another by a porous Celgard separator. The electrolyte was 1 M $LiAsF_6$ dissolved in either propylene carbonate (PC) or a 50:50 mixture of PC and dimethoxyethane (DME). The electrochemical data were collected from pulsed-current discharge tests (one 10-second pulse of 1 mA/cm$^2$ every fifteen minutes) of the button cells. Cells were discharged under pulse to an end voltage of at least 1.5 V. Several cells with different positive electrode materials were constructed for which electrochemical data were collected as defined by the following examples:

EXAMPLE 6

Figure 7:
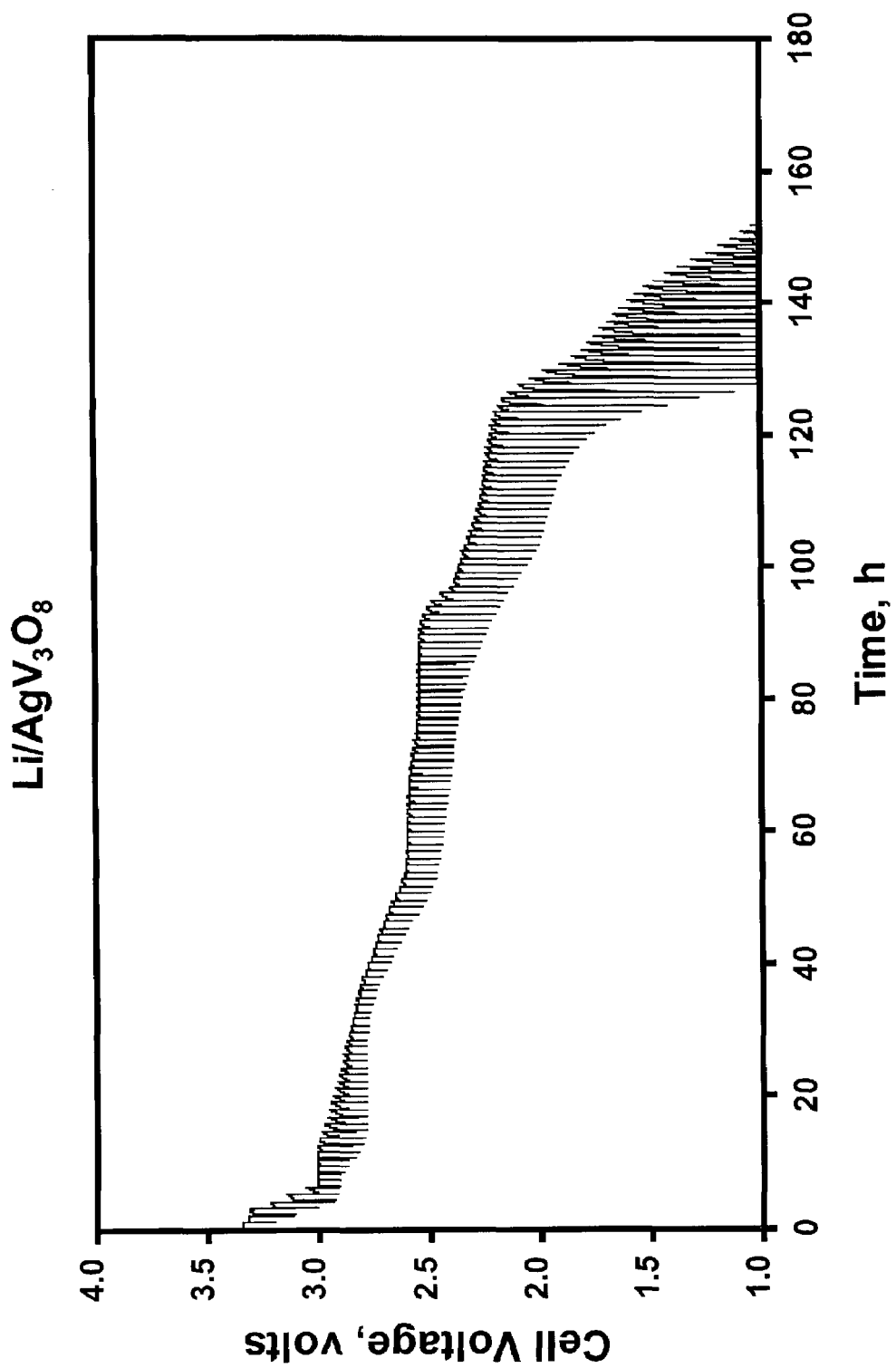
FIG. 7 depicts the electrochemical (pulsed current) profile for the discharge of a $Li/AgV_3O_8$ cell.

The 10-second pulse discharge profile of a lithium cell containing the AgV$_3$O$_8$ electrode of Example 1 is shown in FIG. 7.

EXAMPLE 7

Figure 8:
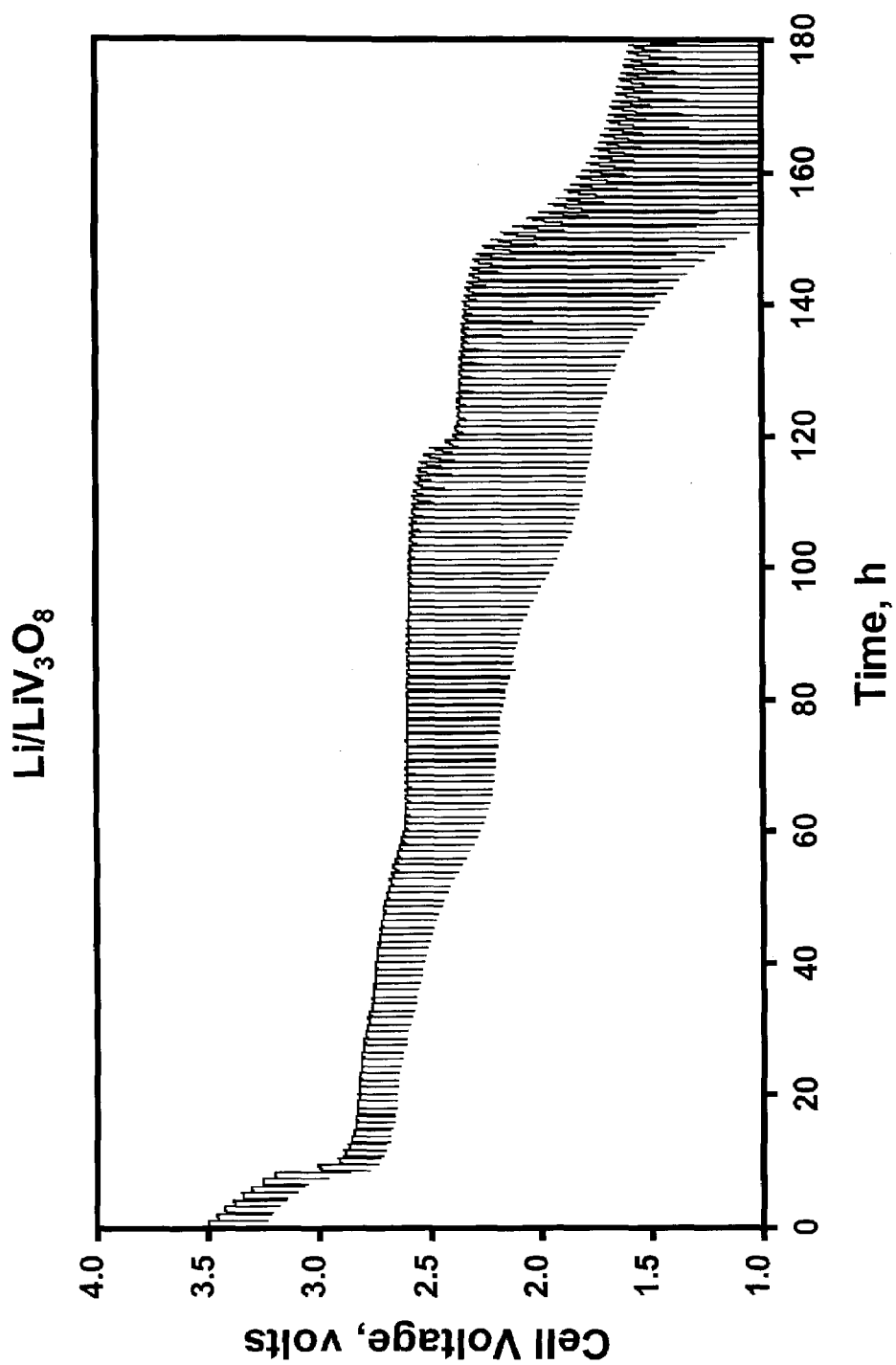
FIG. 8 depicts the electrochemical (pulsed current) profile for the discharge of a $Li/LiV_3O_8$ cell.

The 10-second pulse discharge profile of a lithium cell containing the LiV$_3$O$_8$ electrode of Example 2 is shown in FIG. 8.

EXAMPLE 8

Figure 9:
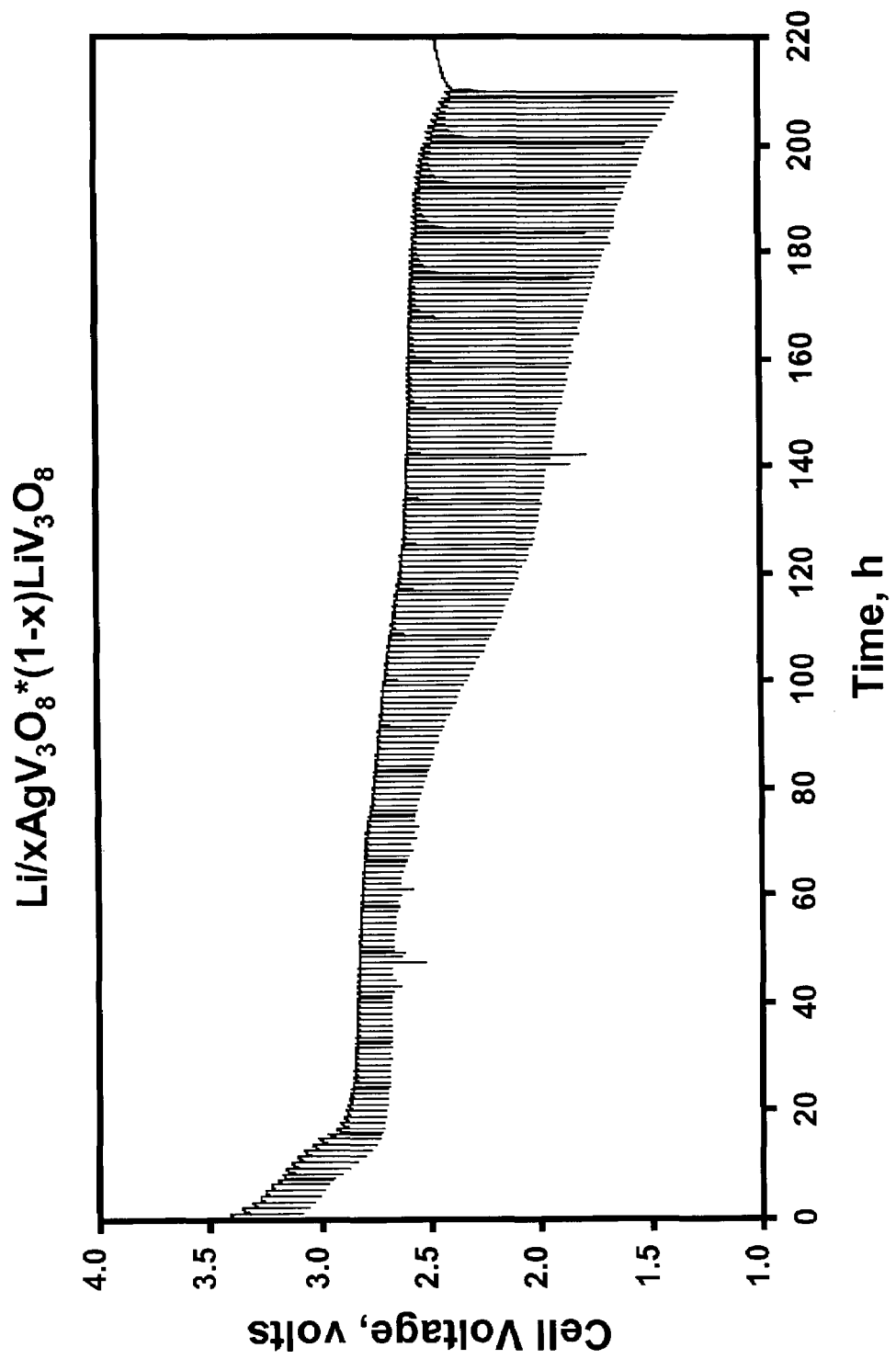
FIG. 9 depicts the electrochemical (pulsed current) profile for the discharge of a Li/xAgV$_3$O$_8$·(1−x)LiV$_3$O$_8$ cell.

The 10-second pulse discharge profile of a lithium cell containing a composite xAgV$_3$O$_8$.(1−x)LiV$_3$O$_8$ electrode of Example 3 is shown in FIG. 9.

EXAMPLE 9

Figure 10:
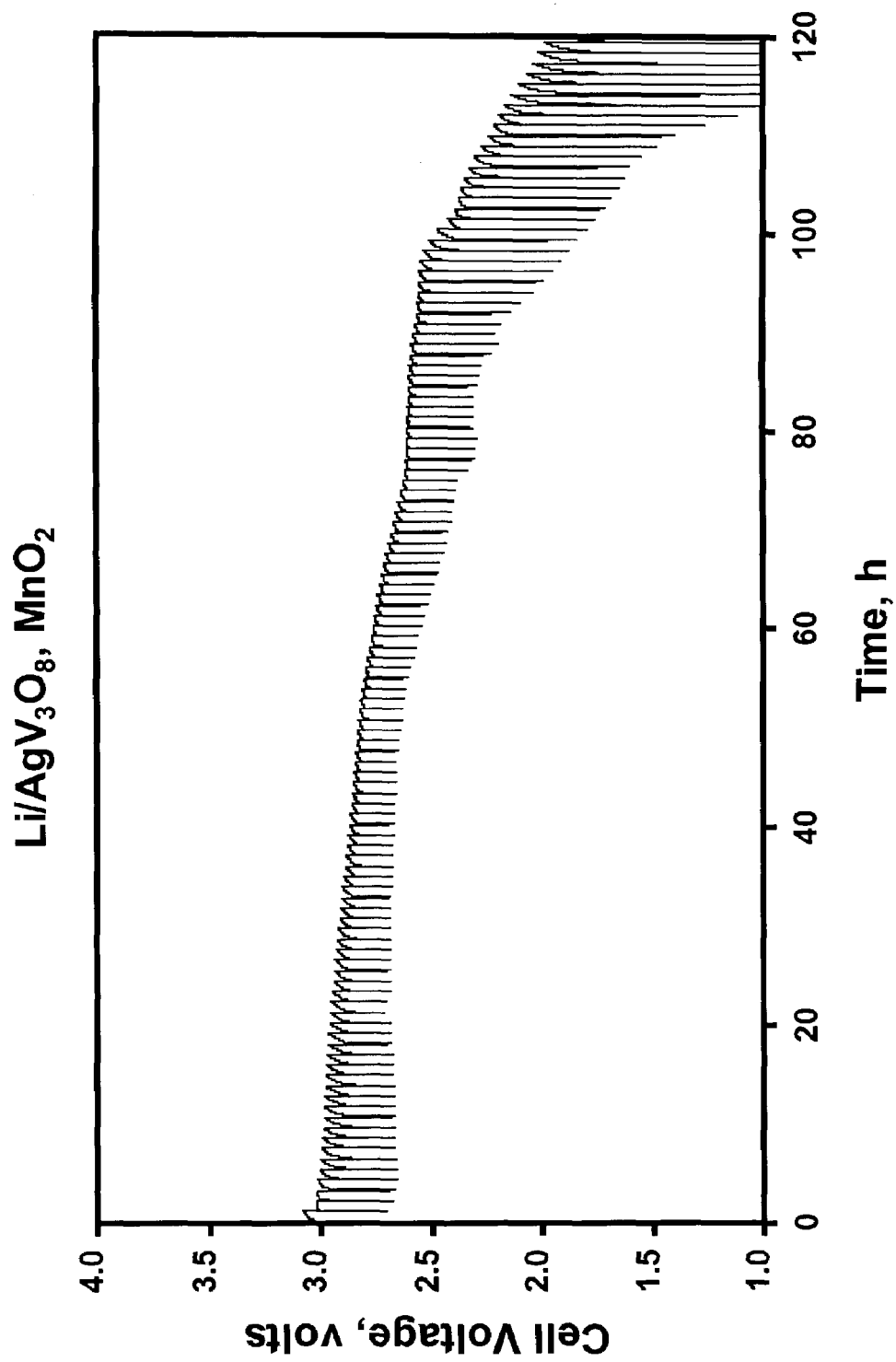
FIG. 10 depicts the electrochemical (pulsed current) profile for the discharge of a Li/AgV$_3$O$_8$, MnO$_2$ cell.
Figure 11:
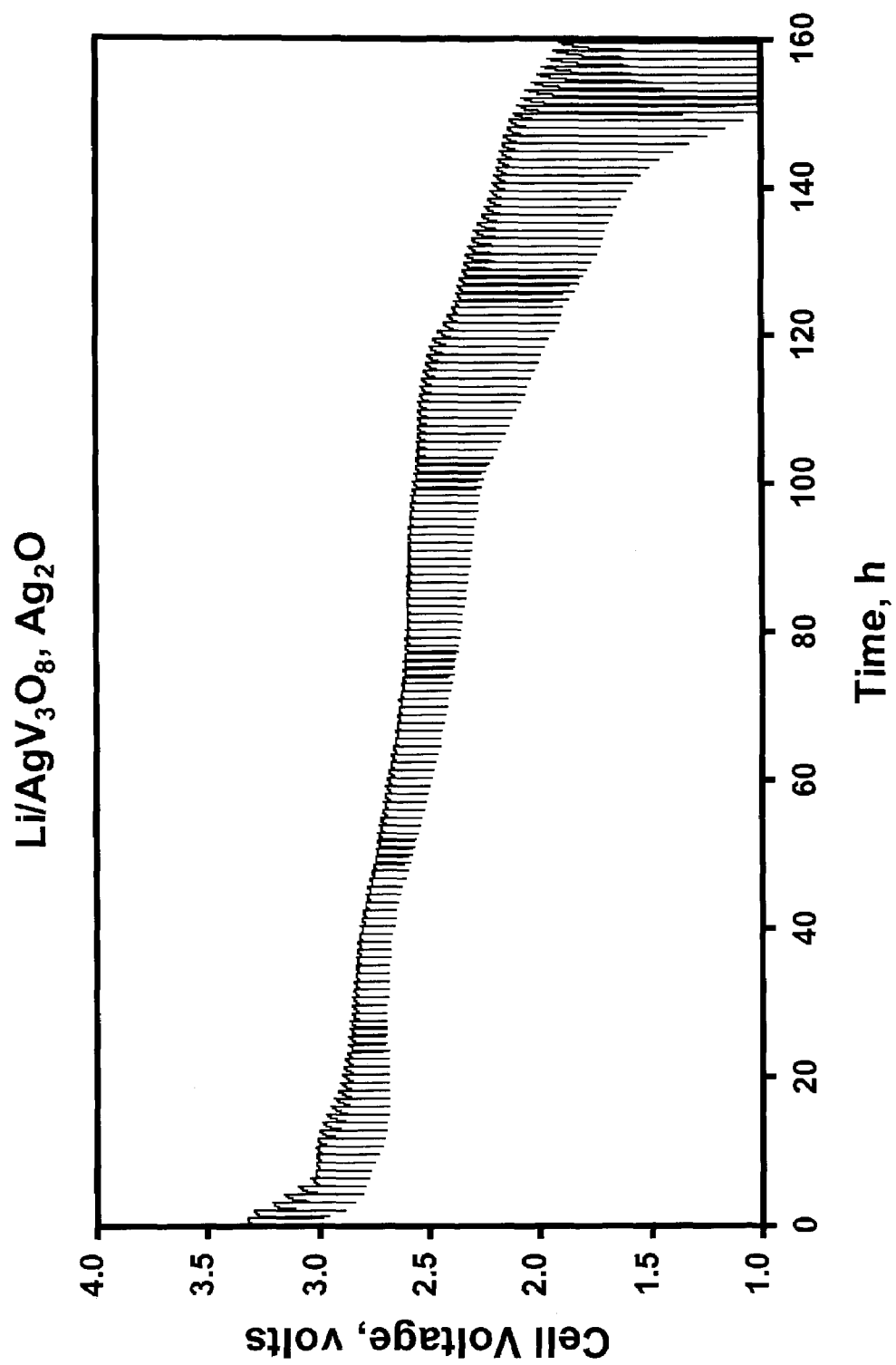
FIG. 11 depicts the electrochemical (pulsed current) profile for the discharge of a Li/AgV$_3$O$_8$, Ag$_2$O cell.
Figure 12:
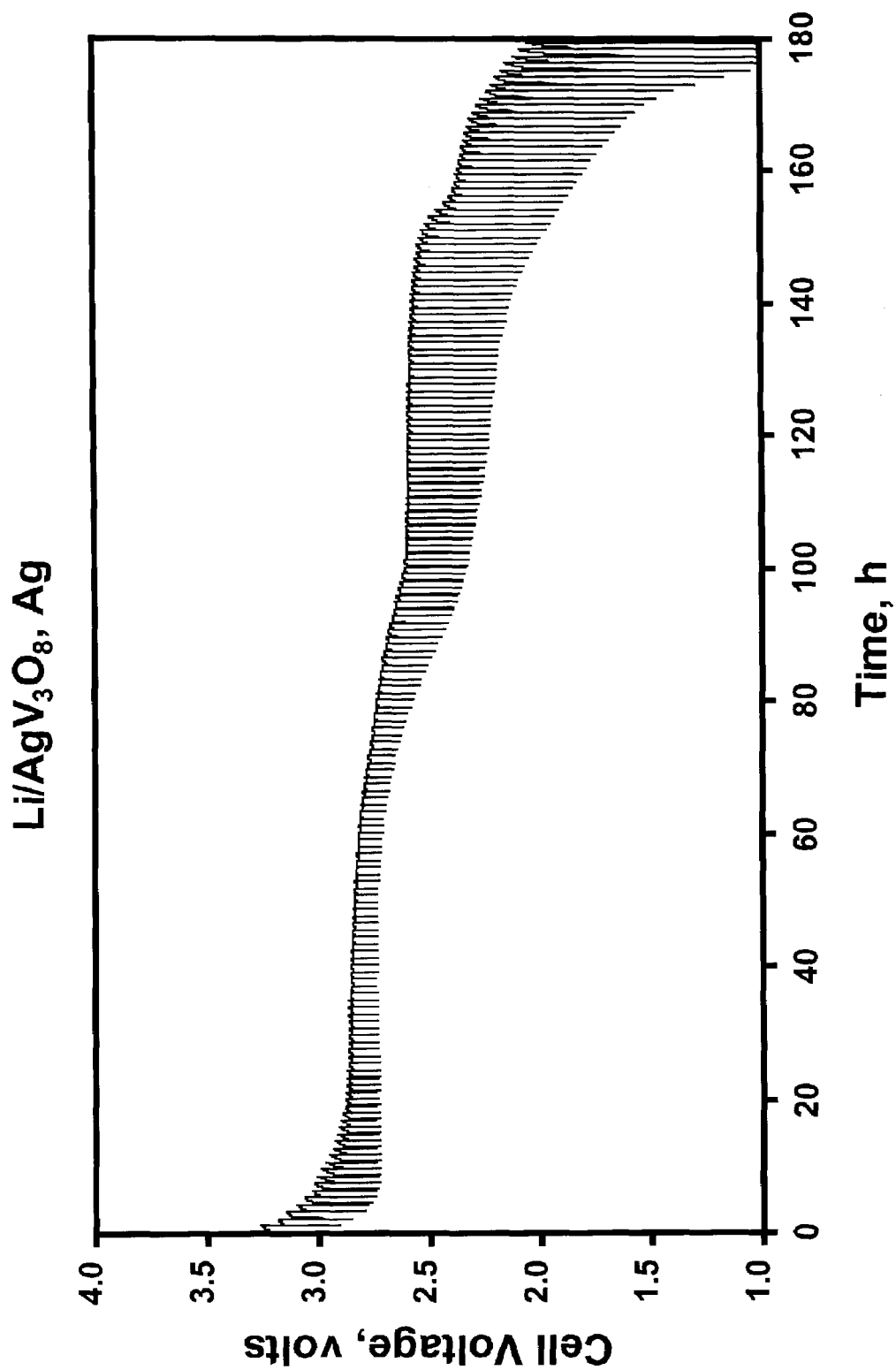
FIG. 12 depicts the electrochemical (pulsed current) profile for the discharge of a Li/AgV$_3$O$_8$, Ag cell.

The 10-second pulse discharge profiles of lithium cells containing the composite electrodes AgV$_3$O$_8$/MnO$_2$; AgV$_3$O$_8$/Ag$_2$O; and AgV$_3$O$_8$/Ag of Example 5 are shown in FIGS. 10, 11 and 12, respectively.

The total capacities of each of the electrodes in Examples 6-9, delivered to an end voltage of 1.7 V and the corresponding energy densities of the lithium cells, are summarized in Tables 2 and 3, which demonstrates the utility of the electrode materials of this invention.

EXAMPLE 10

Ten-second pulse discharge profiles of lithium button cells containing AgV$_3$O$_8$ and Ag$_2$V$_4$O$_{11}$ electrodes with Al and Ag foil current collectors were collected in the same manner as described in the foregoing examples. The results of these experiments are summarized in Table 3; the data show how the specific capacity of both types of silver vanadium oxide electrode, i.e., not only AgV$_3$O$_8$ but also Ag$_2$V$_4$O$_{11}$, can be significantly improved by changing the current collector at the positive electrode from aluminum foil to silver foil, which also results in a significant improvement in the energy density of the lithium cell.

TABLE 2

Performance data of various electrodes

| Electrode Material | Specific Capacity (mAh/g) | Energy Density (mWh/cm$^3$) |
|---|---|---|
| AgV$_3$O$_8$ | 284 | 3049 |
| LiV$_3$O$_8$ | 279 | 2325 |
| xAgV$_3$O$_8$.(1 − x)LiV$_3$O$_8$ | 218 | 2032 |
| AgV$_3$O$_8$/MnO$_2$ | 241 | 2822 |
| AgV$_3$O$_8$/Ag$_2$O | 244 | 2681 |
| AgV$_3$O$_8$/Ag | 265 | 3097 |

TABLE 3

Performance data of AgV$_3$O$_8$ and Ag$_2$V$_4$O$_{11}$ electrodes with Ag and Al foil current collectors

| Electrode Material | Current Collector | Specific Capacity (mAh/g) | Energy Density (mWh/cm$^3$) |
|---|---|---|---|
| AgV$_3$O$_8$ | Al | 248 | 2666 |
| AgV$_3$O$_8$ | Ag | 348 | 3799 |
| Ag$_2$V$_4$O$_{11}$ | Al | 286 | 3474 |
| Ag$_2$V$_4$O$_{11}$ | Ag | 306 | 3652 |

Figure 13:
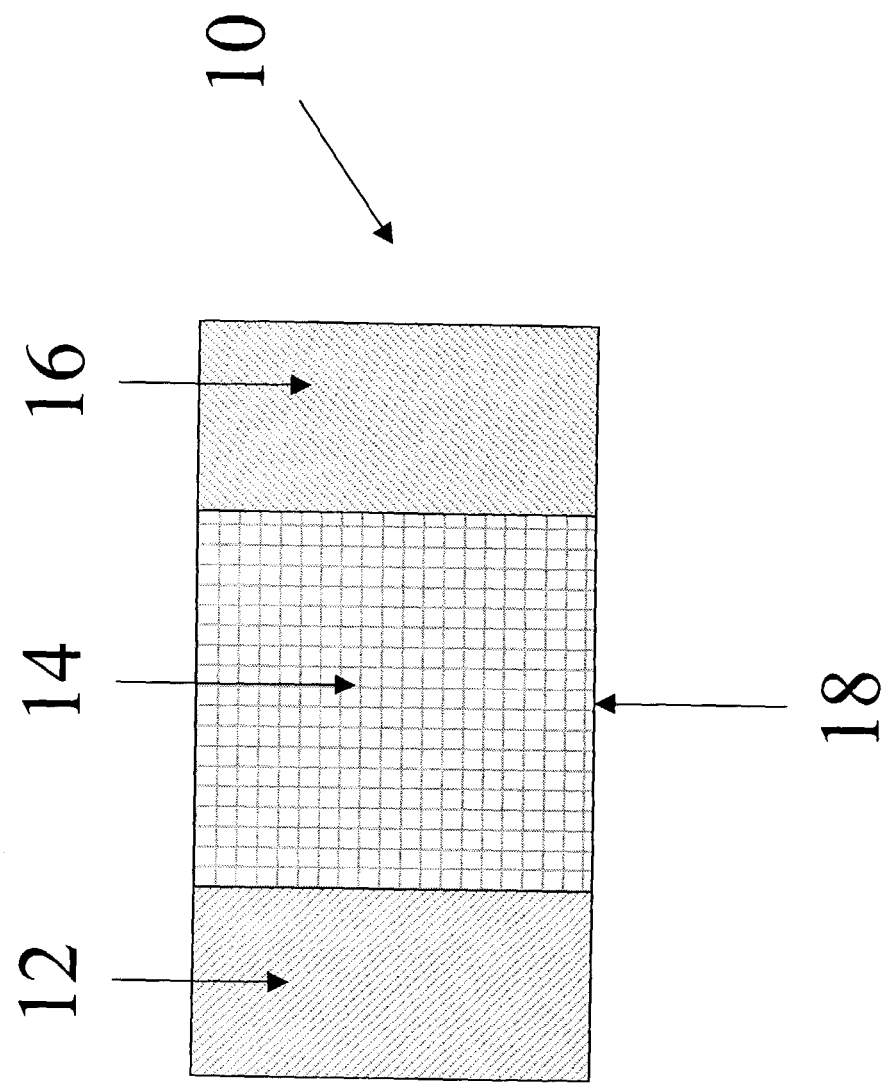
FIG. 13 depicts a schematic illustration of an electrochemical cell.
Figure 14:
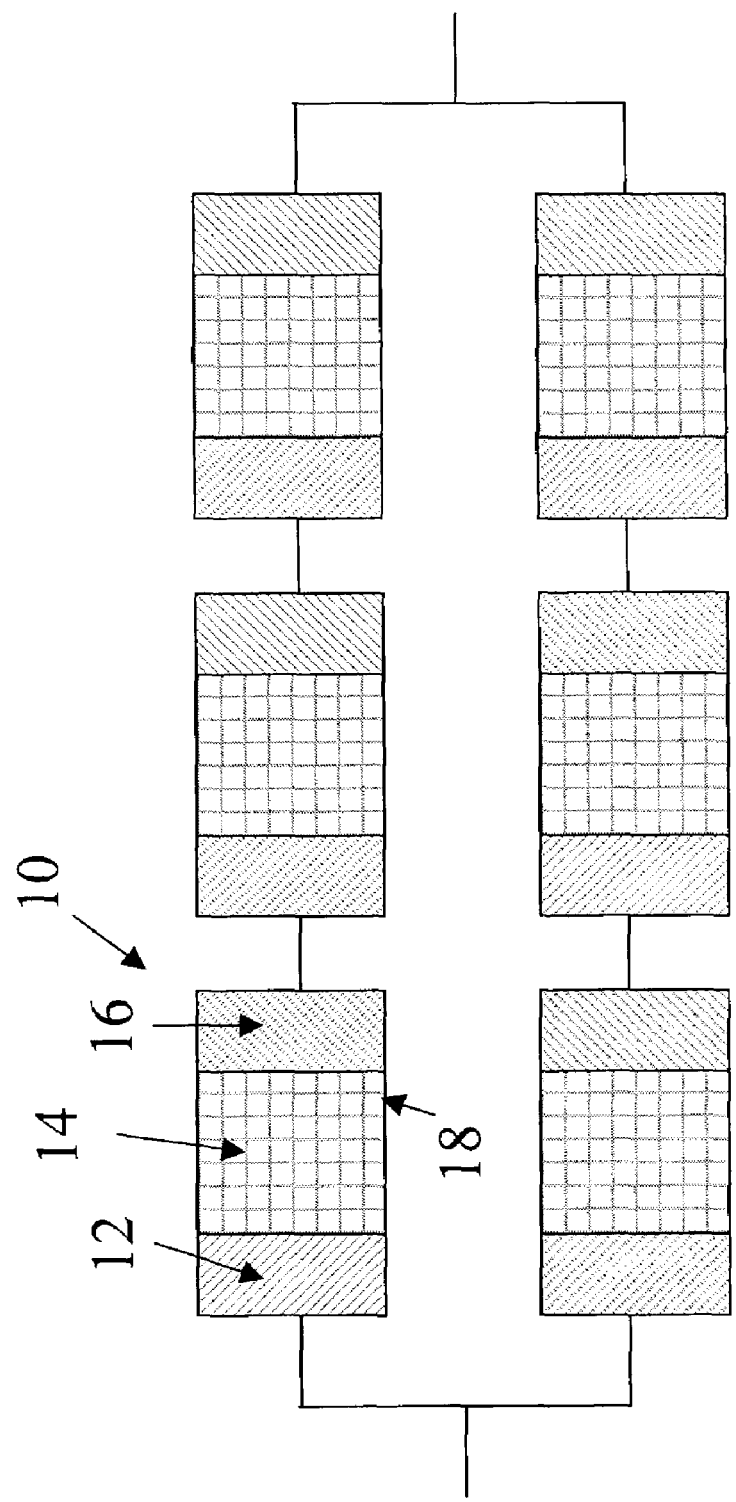
FIG. 14 depicts a schematic illustration of an example of a battery employing the cells of the invention.

This invention, therefore, relates to positive electrodes and current collectors for a non-aqueous electrochemical lithium cell, as shown schematically in FIG. 13, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Negative electrode 12 may be LiV$_3$O$_8$, Ag$_2$V$_4$O$_{11}$, MnO$_2$, CF$_x$, AgF or Ag$_2$O with metallic lithium preferred. Binders and other materials normally associated with both the electrolyte and the negative and positive electrodes are well known in the art and are not described herein, but are included as is understood by those of ordinary skill in this art. FIG. 14 shows a schematic illustration of one example of a battery in which two strings of electrochemical lithium cells, described above, are arranged in parallel, each string comprising three cells arranged in series.

While particular embodiments of the present invention have been shown and described, it will be appreciated by those skilled in the art that changes, modifications and improvements may be made without departing from the true spirit and scope of the invention.

The embodiments of the invention in which an exclusive property or privilege is claimed are defined as follows:

1. A positive electrode for a non-aqueous lithium cell having electroactive material consisting of a composite metal oxide containing AgV$_3$O$_8$ as one component, and one or more additional components selected from the group consisting of LiV$_3$O$_8$, Ag$_2$V$_4$O$_{11}$, MnO$_2$, CF$_x$, AgF or Ag$_2$O.

2. The positive electrode of claim 1, wherein the additional components are selected from LiV$_3$O$_8$ and Ag$_2$V$_4$O$_{11}$.

3. The positive electrode of claim 2, wherein the composite metal oxide is a solid solution of xAgV$_3$O$_8$.(1−x)LiV$_3$O$_8$ or Ag$_x$Li$_{1-x}$V$_3$O$_8$.

4. The positive electrode of claim 3, wherein the composite metal oxide is Ag$_x$Li$_{1-x}$V$_{3-y}$M$_y$O$_8$, in which 0<x<1 and 0<y<1.5, and in which M is one or more monovalent or multivalent transition metals.

5. The positive electrode of claim 4, wherein the M ions are selected from one or more of Ti, Y, Zr, Nb and Mo ions.

6. The positive electrode of claim 4 in which the electrode contains a current collector of silver powder or silver foil or both.

7. The positive electrode of claim 1 in which the electrode contains a silver powder or silver foil current collector.

8. A non-aqueous lithium electrochemical cell comprising a negative electrode, an electrolyte and a positive electrode, the positive electrode having electroactive material consisting of a composite metal oxide containing AgV$_3$O$_8$ as one component, and one or more additional components selected from the group consisting of LiV$_3$O$_8$, Ag$_2$V$_4$O$_{11}$, MnO$_2$, CF$_x$, AgF or Ag$_2$O.

9. The non-aqueous lithium electrochemical cell of claim 8 in which the positive electrode contains a silver powder or silver foil current collector.

10. The non-aqueous lithium electrochemical cell of claim 8 in which the negative electrode is selected from metallic lithium, lithium alloys, lithium intermetallic compounds and lithiated carbon.

11. The non-aqueous lithium electrochemical cell of claim 8 in which the negative electrode is metallic lithium.

12. The non-aqueous lithium electrochemical cell of claim 8, wherein the cathode is selected from $LiV_3O_8$ and $Ag_2V_4O_{11}$.

13. The non-aqueous lithium electrochemical cell of claim 8, wherein the composite metal oxide in a solid solution $xAgV_3O_8 \cdot (1-x)LiV_3O_8$ or $Ag_xLi_{1-x}V_3O_8$.

14. The non-aqueous lithium electrochemical cell of claim 8, wherein the composite metal oxide is $Ag_xLi_{1-x}V_{3-y}M_yO_8$, in which $0<x<1$ and $0<y<1.5$, and in which M is one or more monovalent or multivalent transition metals.

15. The non-aqueous lithium electrochemical cell of claim 14 in which the electrode contains a silver powder or silver foil current collector.

16. The positive electrode of claim 15 in which the electrode contains a current collector of silver powder or silver foil or both.

17. The non-aqueous lithium electrochemical cell of claim 8, wherein the M ions are selected from one or more of Ti, Y, Zr, Nb and Mo ions.

18. A non-aqueous lithium battery comprising a plurality of electrochemical cells, electrically connected, each cell comprising a negative electrode, an electrolyte and a positive electrode, the positive electrode having electroactive material consisting of a composite metal oxide containing $AgV_3O_8$ as one component, and one or more additional components selected from the group consisting of $LiV_3O_8$, $Ag_2V_4O_{11}$, $MnO_2$, $CF_x$, AgF or $Ag_2O$.

19. A non-aqueous lithium battery of claim 18, in which the positive electrode of each electrochemical cell contains a silver powder or silver foil current collector.

20. A non-aqueous lithium battery of claim 18, in which the negative electrode of each electrochemical cell is selected from metallic lithium, lithium alloys, lithium intermetallic compounds and lithiated carbon.

21. A non-aqueous lithium battery of claim 18, in which the negative electrode of each electrochemical cell is metallic lithium.

22. The non-aqueous lithium electrochemical battery of claim 18, wherein the cathode is selected from $LiV_3O_8$ and $Ag_2V_4O_{11}$.

23. The non-aqueous lithium electrochemical battery of claim 18, wherein the composite metal oxide in a solid solution of $xAgV_3O_8 \cdot (1-x)LiV_3O_8$ or $Ag_xLi_{1-x}V_3O_8$.

24. The non-aqueous lithium electrochemical battery of claim 18, wherein the composite metal oxide is $Ag_xLi_{1-x}V_{3-y}M_yO_8$, in which $0<x<1$ and $0<y<1.5$, and in which M is one more monovalent or multivalent transition metals.

25. The non-aqueous lithium electrochemical battery of claim 24 in which the electrode contains a silver powder or silver foil current collector.

26. The non-aqueous lithium electrochemical battery of claim 18, wherein the M ions are selected from one or more of Ti, Y, Zr, Nb and Mo ions.

27. A non-aqueous lithium electrochemical cell having electroactive material consisting of a negative electrode, an electrolyte and a positive electrode, the positive electrode comprising $AgV_3O_8$ as one component, and one or more additional components selected from the group consisting of $LiV_3O_8$, $Ag_2V_4O_{11}$, $MnO_2$, $CF_x$, AgF or $Ag_2O$.

28. The non-aqueous lithium electrochemical cell of claim 27, wherein the current collector is powder or foil.

29. A non-aqueous lithium battery comprising a plurality of electrochemical cells electrically connected, each cell comprising a negative electrode, an electrolyte and a positive electrode, the electroactive material consisting of a composite metal oxide containing $AgV_3O_8$ as one component, and one or more additional components selected from the group consisting of $LiV_3O_8$, $Ag_2V_4O_{11}$, $MnO_2$, $CF_x$, AgF or $Ag_2O$.

30. The non-aqueous lithium electrochemical cell of claim 29, wherein the current collector is powder or foil.

* * * * *

UNITED STATES PATENT AND TRADEMARK OFFICE
CERTIFICATE OF CORRECTION

| | |
|---|---|
| PATENT NO. | : 7,435,509 B2 |
| APPLICATION NO. | : 10/338507 |
| DATED | : October 14, 2008 |
| INVENTOR(S) | : Thackeray et al. |

It is certified that error appears in the above-identified patent and that said Letters Patent is hereby corrected as shown below:

Column 9, claim 13, line 14, after the word "solution" insert --of--.

Column 9, claim 17, line 27, delete "8" and insert --16-.

Signed and Sealed this

Thirty-first Day of March, 2009

JOHN DOLL
*Acting Director of the United States Patent and Trademark Office*